W. A. FLANDERS.
Bee Hive.
No. 42,181.
Patented April 5, 1864.
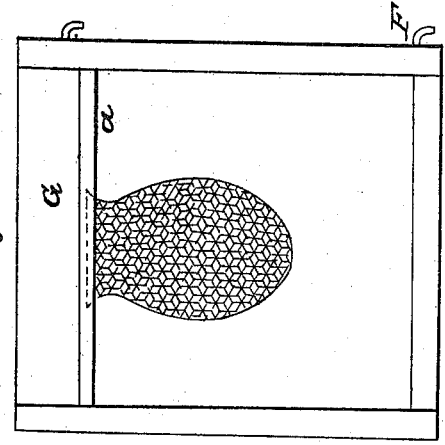
Fig. 4
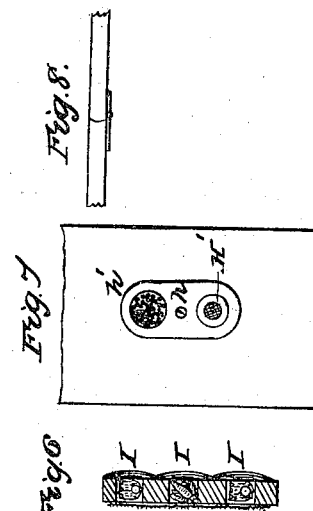
Fig. 8
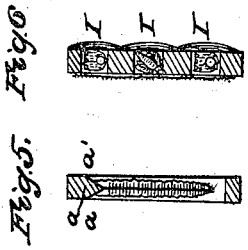
Fig. 7
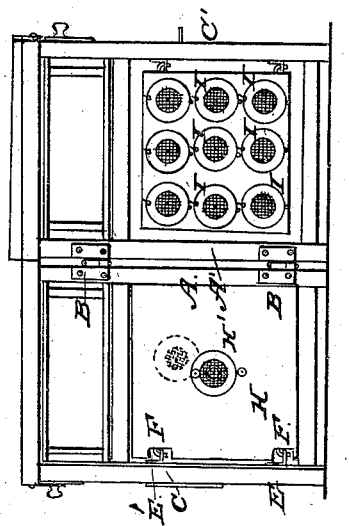
Fig. 2
Fig. 6
Fig. 5
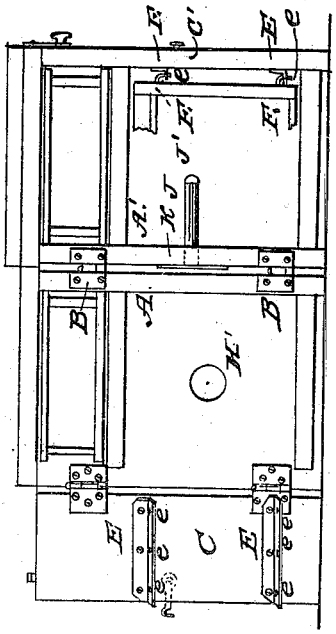
Fig. 3
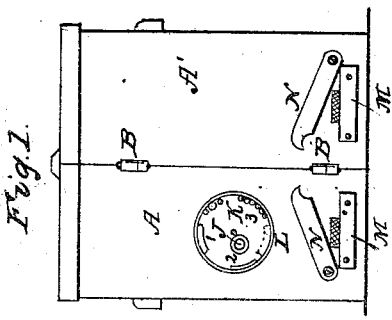
Fig. 1
Witnesses
Inventor
W. A. Flanders

UNITED STATES PATENT OFFICE.

W. A. FLANDERS, OF SHELBY, OHIO.

IMPROVEMENT IN BEE-HIVES.

Specification forming part of Letters Patent No. 42,181, dated April 5, 1864.

*To all whom it may concern:*

Be it known that I, W. A. FLANDERS, of Shelby, in the county of Richland and State of Ohio, have invented new and useful Improvements in Bee-Hives; and I do hereby declare that the following is a full and complete description of the construction and operation of the same, reference being had to the accompanying drawings, making part of this specification, in which—

Figure 1 is a front view. Fig. 2 is an interior view, the hive being thrown open, showing the division-board and the queen and drone cells. Fig. 3 shows the hive open with a section of one of the comb-frames, also with one of the sides thrown still farther open in order to bring the frames out of the body of the hive. Fig. 4 is a comb-frame detached and enlarged, showing the manner in which the comb is attached; and Fig. 5, 6, and 7 are detached sections.

Like letters refer to like parts in the several views.

My invention relates to the opening of the hive, and so constructing and hinging the comb-frames that any of them can be removed at pleasure; to dividing the hive into sections by division-boards which are removable at pleasure and their places supplied with comb-frames for the objects hereinafter specified; to the construction of queen and drone cells for the multiplication and preservation of queen bees and drones, and to the devices for reclaiming fugitive swarms and supplying them with impregnated queens. The body of the hive is of rectangular shape made in two parts. The front shown at A A' are hinged together, as shown at B B. The two opposite walls, C C', are also hinged, as shown at D, Fig. 3, so that they can be opened upon a line with the ends of the hive, as shown in Fig. 3, for the purpose of bringing the comb-frames, which are hinged thereto, as hereinafter set forth, entirely out of the body of the hive. The hinges B and D are made like those of a rule or table joint, or in any other form that will allow the two sections of the hive or the hinged wall C C' to be closed without danger of crushing the bees, there being no impinging angles upon the inner surfaces. Upon the inside of the walls C C', I place two strips of metal or wood, E E, which constitute the bearing or support of the comb-frames, dividing-boards, and bee-cells. These pieces turn inward at right angles to the walls, and are provided with holes $e$ $e'$ $e''$, into which the hooks F on the comb-frames fit, and upon which they articulate, so that any of the frames can be removed at pleasure and others introduced in their stead. The hooks on the lower end of the comb-frames are longer than those on the upper end, and consequently, in replacing the comb-frames the hook enters the lower hole first. The end of the upper one, resting upon the upper surface of the upper strip, E, is easily and conveniently caused to enter the required hole.

Fig. 4 represents a comb-frame enlarged, with a piece of comb attached. Fig. 5 represents a cross-section of the same, showing a spine or ridge, $a$, along the under side of the upper cross-bar, G. This spine $a$, in connection with the shoulder $a'$, which runs parallel therewith, affords a convenient starting-point for the bees to attach their comb.

I have found from experience that the bees will commence the center of their combs along this spine, and the frames being as thick as the usual length of both cells in the comb the bees will never cross the combs from one frame to the other, thus leaving each frame clear of any attachment to the other frames, so that any one can be removed without breaking the comb, as above stated.

H represents a division-board used in dividing the interior of the hive into two or more parts for the purpose of keeping a larger number of queens during the early part of the season, by which means a larger brood of working bees may be raised to meet the first growth of flowers. This division-board is perforated in the center, as seen at H', for the introduction of a tube to allow the bees to pass from one division of the hive to the other when the hive is used for reclaiming fugitive swarms, as hereinafter specified. In the wall of the hive, directly opposite to the hole H', is another hole, H'', for the admission of light and for ventilation. This hole is provided with a cover or slide, $h$, which turns on a pin in the center. One end of this slide is provided with a glass plate to admit the light to decoy the bees into the second division of the hive. The other end of the slide is perforated for the purpose of ventilation, and either can be turned over the whole at pleasure, either one of which will prevent the escape of the bees. When the tube through the hole H' is removed, the hole H' is covered by a perforated slide, h', to retain the bees, and at the same time promote circulation through the hive.

The queen and drone cages are shown at I in Figs. 2 and 6. This is made of a board, about an inch in thickness and of the size of a comb-frame, and provided with hinges F, like the comb frames, and will therefore fit into their places. A series of holes of an inch or more in diameter are bored through this board, and one side is covered with a wire-cloth, the meshes of which are too small to admit the passage of the working bee. On the opposite side of each cage I affix with a hinge a wire cloth door, that can be opened and closed at pleasure. The use and operation of these cages I will more fully explain hereinafter.

J represents a curtained tube, which I introduce through the wall A' of the hive when used for the recovery of a fugitive swarm. Consequently, this tube occupies that side of the hive at right angles to that containing the tube H. This curtained tube is made of a straight piece of tin tubing about half an inch or more in diameter and long enough to reach within two or three inches of the middle of the hive, being inserted as hereinafter stated. The inner end of this tube is capped, as shown in Fig. 3 at J', leaving an opening on each side of the curtain for the passage of the bees. The curtain, while it offers no obstruction to the entrance of the bees, cuts off the light and prevents them from returning by the same way they entered. In this situation the bees, seeing the light as it shines through the tube H', are attracted into that division of the hive, and are prevented from escaping by the glass over the hole H''. This curtained tube J passes through a disk, K, upon the front wall, A, and when the hive is closed, as in Fig. 1, the curtained tube J is at right angles to the tube in the division-board H. When the tube J is in, as seen in Fig. 1, the disk covers an opening indicated by the dotted lines L, which forms a common entrance for the bees. There are two openings in the disk, marked 1 and 2. Number 1 of the disk is large enough for female bee or drone, and affords a common entrance when moved around so as to correspond in position with the opening L. In this case the tube J must be removed, and when the disk is adjusted, as above, the opening for the tube is covered. The opening No. 2 is just five thirty-second parts of an inch (.015625) wide, which is just sufficient to admit the passage of the working bees, but not large enough to admit the escape of the queen bee; consequently when No. 2 is over the opening L the swarm will not pass out. No. 3 is for ventilation, and the holes are sufficient only for the admission of air. No. 4 shows three holes just large enough for the admission of a single working bee at a time. In this way (all other openings into the hive being closed) the swarm can protect itself against robbers, for a single bee can defend one passage.

M M represents the ordinary passage into the hive, which can be closed at pleasure by the doors N N. The hive can, therefore, be completely shut at any time, so that there can be no ingress or egress.

In reclaiming a fugitive swarm I proceed as follows: I take the hive near to the place where I think the swarm is located and remove the frames from the side where the tube J enters the hive through the regulator K, upon the front of the hive. I then set a plate of honey in this part of the hive. The dividing-board H is now placed in that part of the hive opposite to that in which the decoy-feed is placed, in the first hinges e e, so as to divide the hive as nearly as possible into two equal parts, and the tube H', inserted through the division-board, the hole opposite being at the same time covered with the glass H'' to admit the light. I now take the curtained tube J in my hand and find a bee at work on a flower, and, holding my fingers over the curtained end of the tube, I catch the bee in the other end of the tube and run the tube and bee into the hive. The bee enters the hive and begins to feed upon the honey. I now withdraw the tube J and let the bee go home with its load of honey, and in a little time the whole swarm will be busy in carrying off the honey through the hole for the pipe J. I will now capture and hive them by introducing the curtained tube J into its place, as before described, for the bees enter this tube, and after supplying themselves with all the honey they can carry, are prevented from passing out of the hive by the way they entered, and, as the light shines through the tube H', they pass through this into the second department, as fast as they fill themselves with honey, until the whole swarm is captured. I now remove the hive and place it upon the stand, and supply the swarm with a queen-bee, and after the swarm has been confined in the hive three or four days, they go to work as loyal citizens, being fully satisfied with their new quarters and new queen.

In dividing or opening the hive it is of great advantage to throw one-half of the frames on each side, for the reason that in hunting for the queen where the swarm is parted the flying bees will settle on that part containing the queen; consequently, the action of the bees, as they indicate on which side the queen is located, and we have to look over only one-half of the frames.

The principle involved in the construction of my improved hive can be applied to a single form without a hinge in its center, having the frames hinged directly to the door, either in front or rear, so that said frames may be brought directly out of the hive altogether. Whether or not the hive opens in the middle, the doors should be made with a rule-joint, so as to leave no shoulder, by which the bees would be crushed while opening the door. The structure of this rule-joint is shown in Fig. 8.

What I claim as my improvement, and desire to secure by Letters Patent, is—

1. In combination with a dividing hive constructed substantially as specified, hinging the comb-frames by means of the extension-hinge E F to the back or front walls, so that in opening the hive the comb-frames are brought out of the hive in the manner and for the purpose set forth.

2. So hinging the back or front of the hive, and so attaching the comb-frames thereto, that on opening the hive all the frames attached to one section may be swung out of the hive together, as and for the purpose specified.

3. In combination, the curtained tube J, the division-board H, tube H', and glass H'', operating as described, for the purpose specified.

4. The queen and drone cages, when constructed and operated as specified.

5. The disk K, with the openings 1, 2, 3, and 4, in combination with the openings L, arranged and operating as and for the purpose set forth.

6. Forming the joints of any portion of the bee-hive that opens and shuts so that the angles and edges of the parts forming the joint or joints will not separate upon opening the hive or impinge upon each other when the parts are being closed, substantially as specified, for the purpose set forth.

W. A. FLANDERS.

Witnesses:
JOHN H. COX,
ABM. FARRINGTON.